United States Patent
Heinemann et al.

(10) Patent No.: US 9,381,586 B2
(45) Date of Patent: Jul. 5, 2016

(54) DEVICE AND METHOD FOR HOB PEELING INTERNALLY GEARED WHEELS AND RELATED PEELING WHEEL

(75) Inventors: Wolfgang Heinemann, Remscheid (DE); Marcel Sobczyk, Solingen (DE)

(73) Assignee: PROFILATOR GMBH & CO. KG, Wuppertal (DE)

( * ) Notice: Subject to any disclaimer, the term of this patent is extended or adjusted under 35 U.S.C. 154(b) by 1198 days.

(21) Appl. No.: 13/377,488

(22) PCT Filed: Jun. 1, 2010

(86) PCT No.: PCT/EP2010/057646
§ 371 (c)(1),
(2), (4) Date: Feb. 22, 2012

(87) PCT Pub. No.: WO2010/142578
PCT Pub. Date: Dec. 16, 2010

(65) Prior Publication Data
US 2012/0148360 A1 Jun. 14, 2012

(30) Foreign Application Priority Data
Jun. 10, 2009 (DE) .......................... 10 2009 025 945

(51) Int. Cl.
*B23F 5/16* (2006.01)
*B23F 21/16* (2006.01)

(52) U.S. Cl.
CPC .................. *B23F 5/163* (2013.01); *B23F 21/16* (2013.01); *Y10T 407/1715* (2015.01);
(Continued)

(58) Field of Classification Search
CPC .............. B23F 5/22; B23F 5/24; B23F 5/163;
B23F 9/08; B23F 9/082; B23F 21/16; B23F
21/18; Y10T 407/1715; Y10T 407/1705;
Y10T 407/1735; Y10T 407/174; Y10T
407/1745; Y10T 409/10159; Y10T
409/101749; Y10T 409/102544; Y10T
409/102703; Y10T 409/102862; Y10T
409/105883; Y10T 409/107791
USPC .......... 407/23, 27, 28, 29; 409/11, 12, 17, 18,
409/19, 33, 34, 37, 38, 49, 50, 51
See application file for complete search history.

(56) References Cited

U.S. PATENT DOCUMENTS 2,124,126 A * 7/1938 Scott ............................... 407/28
2,284,636 A * 6/1942 Carlsen .......................... 409/26
(Continued)

FOREIGN PATENT DOCUMENTS

CH          279386 A * 11/1951
DE          19933137       1/2000
(Continued)

OTHER PUBLICATIONS

EPO Machine Translation of DE 19933137 A1: Werner et al., "Machining undercuts into flanks of teeth on internally or externally toothed work wheels, using cutting edges on teeth in toothed work wheel," 2000, Jan. 27.*

*Primary Examiner* — Sunil K Singh
*Assistant Examiner* — Michael Vitale
(74) *Attorney, Agent, or Firm* — Lucas & Mercanti, LLP; Klaus P. Stoffel

(57) ABSTRACT

The invention relates to a device for generating teeth of workpieces (3) by hob peeling, having a workpiece spindle (1) that can be rotatably driven for accommodating the work wheel (3) to be geared, particularly internally, and having a tool spindle (2) that can be rotatably driven, said tool spindle (2) carrying a peeling wheel (4), which has a regular tooth pitch determined by the tooth spacing of the gearing of the workpiece (3). In order to improve the performance of the generic device and/or generic method, and to provide the peeling wheel suited therefor, it is proposed that the distance between at least some of the teeth of the peeling wheel (4) that are of identical shape corresponds to a multiple of the regular tooth pitch.

7 Claims, 4 Drawing Sheets

(52) U.S. Cl.
CPC .................. *Y10T 409/10159* (2015.01); *Y10T 409/101749* (2015.01); *Y10T 409/102862* (2015.01); *Y10T 409/105883* (2015.01); *Y10T 409/107791* (2015.01)

(56) References Cited

U.S. PATENT DOCUMENTS 2,646,611 A * 7/1953 Bauer .............................. 407/29
2,756,641 A * 7/1956 Skog ............................... 409/39
2011/0268523 A1   11/2011 Heinemann et al.

FOREIGN PATENT DOCUMENTS

| DE | 102005049530 A |  1/2007 |
| DE | 102007015357   | 10/2008 |
| DE | 102008037514 A |  5/2010 |

* cited by examiner

DEVICE AND METHOD FOR HOB PEELING INTERNALLY GEARED WHEELS AND RELATED PEELING WHEEL

The present application is a 371 of International application PCT/EP2010/057646, filed Jun. 1, 2010, which claims priority of DE 10 2009 025 945.7, filed Jun. 10, 2009, the priority of these applications is hereby claimed and these applications are incorporated herein by reference.

BACKGROUND OF THE INVENTION

The invention pertains to a device for cutting gear teeth in workpiece wheels by hob peeling with a rotatably drivable workpiece spindle, which holds the workpiece wheel into which the gear teeth, especially internal teeth, are to be cut, and with a rotatably drivable tool spindle, which carries a peeling wheel comprising cutting teeth.

The invention also pertains to a method for cutting teeth in workpiece wheels by hob peeling, in which a workpiece spindle, which holds a workpiece wheel into which the teeth are to be cut, is driven in rotation; in which a tool spindle, which carries a peeling wheel comprising cutting teeth, is driven in rotation in a fixed rotational speed ratio to the workpiece spindle; and in which the peeling wheel is fed forward in the axial direction of the workpiece wheel by means of relative movement between the tool spindle and the workpiece spindle.

The invention also pertains to a peeling wheel with a plurality of cutting teeth arranged in a gear tooth-like manner around a rotational axis.

A device, a method, and a peeling wheel of the type described above are described in DE 10 2007 015 357 A1. The workpiece wheel is rotated continuously by a workpiece spindle. So that the workpiece can be fed forward, the workpiece spindle can be shifted in the direction of its axis. The peeling wheel, which is a tool in the shape of a gear wheel, is rotated by a tool spindle in synchrony with the workpiece wheel. The axis of the tool spindle crosses the axis of the workpiece spindle at a fixed angle; although fixed, this angle can also be adjusted on the machine. During the forward feed, which proceeds continuously as the axes of the workpiece and of the tool are rotated continuously, material is peeled off the blank by cutting edges, which extend along the wide-side contour line of the cutting teeth.

To cut a gear, many strokes can be performed in succession, wherein the cutting depth is increased from cut to cut. The peeling wheel has a regular tooth pitch. A cutting tooth, which comprises cutting edges, is located at each tooth pitch position. All of the teeth have the same shape, so that each tooth of the peeling wheel is always next to identically shaped teeth.

The non-prior art document DE 10 2008 037 514 describes a device and a method for generating internal gearing on tubular tools. In the case of internal gearing, the problem is that the gear teeth of the two meshing sets of teeth overlap each other to a considerable extent. To reduce the extent of the overlapping area, the peeling wheel must comprise a small diameter. This has the result that the overall cutting efficiency is reduced. It therefore becomes necessary to increase the rotational speed. In the case of workpieces with internal teeth of considerable axial length, furthermore, the crossing angle of the axes must be small. This, too, leads to a decrease in cutting efficiency in comparison to the cutting of external gearing.

SUMMARY OF THE INVENTION

The invention is based on the goal of increasing the efficiency of the device and the method of the general type in question and to provide a peeling wheel suitable for the method.

What is essential is a special elaboration of the peeling wheel and of its use on a machine tool and in a tooth-cutting method. According to the invention, a tooth of a different design or possibly no tooth at all is present in at least one position of the regular tooth pitch. In this area, the minimum distance between adjacent identically shaped teeth is equal to a multiple of the regular tooth pitch, namely, to twice that pitch. Otherwise, the peeling wheel has cutting teeth arranged like those of a gear wheel; as in the case of the known peeling wheel, these cutting teeth lie in positions which allow them to engage in the spacewidths of the workpiece wheel. The distance between at least some directly adjacent cutting teeth is equal to a multiple of the tooth spacing of the set of teeth to be fabricated and therefore to at least twice that spacing. This is easily realized by leaving out individual teeth. The remaining teeth or spacewidths are preferably arranged in periodically recurring intervals in the circumferential direction. The tool therefore has a periodically reduced number of teeth. Depending on the given type of regularity, every second or every third tooth can be omitted from the regular tooth pitch. It is also provided, however, that two successive teeth can also be omitted in each case, so that adjacent cutting teeth are three times the tooth spacing of the set of gear teeth to be fabricated, which corresponds to the regular tooth pitch of a standard tool. The choice of tool, i.e., the locations of the missing teeth, will be selected as a function of the number of teeth of the workpiece to be cut. If the workpiece to be cut has, for example, an odd number of teeth, the tool can have an even number of tooth positions, wherein only every second position is occupied by a tooth, so that the teeth are separated from each other by twice the tooth spacing of the regular tooth pitch. As a result of this design of the peeling wheel, peeling wheels with a relatively large diameter can be used to fabricate sets of internal gear teeth. Because of the missing teeth, the effective overlapping area is reduced. It is ensured, however, that there will always be a tooth in engagement with the workpiece during the continuous peeling work. The relatively large diameter of the peeling wheel also means that the axis of the peeling wheel will be at the maximum possible distance from the inside wall of the tubular workpiece. As a result, relatively large axis crossing angles can be selected without the danger of collision. Although the diameter of the tool spindle can be reduced to a certain degree to achieve the required axial penetration depth, the diameter of the shaft remains sufficiently large. DE 199 33 137 A1 has already described a gear wheel-shaped tool, in which teeth of different shapes lie next to each other. This tool, however, is not a peeling wheel. The cutting edges here do not extend along the contour line of the teeth, that is, in the plane of the wide side, but rather parallel to the axial direction, because, in the case of the undercutting described there, the feed occurs in the radial direction and not, as in the case of peeling, in the axial direction. The inventive hob peeling method is a continuous tooth-cutting method, which lies kinematically between bobbing and shaping. Whereas shaping resembles the gear kinematics of a spur gear drive, hob peeling kinematically resembles a helical gear drive. Various types of teeth can be produced by hob peeling. The workpiece axis and the tool axis are arranged at a skew to each other. By means of the inventive method, straight-toothed gears can be produced by means of a purely axial feed movement. If changes in the phase position dependent on the axial positioning are superimposed on the linear displacement of, for example, the workpiece spindle, then it is also possible to produce workpieces with spiral gear teeth. By means of the inventive method, a set of teeth can be machined into the circular cavity inside a blank, wherein the workpiece and the tool are rotated synchronously with each other in a fixed rotational speed ratio, each by its own drive motor, which can be a torque motor. The radially projecting cutting teeth of the peeling wheel, which comprise cutting edges on the end surfaces facing the wide side, cut into the material of the workpiece. Because the axis of the workpiece crosses the tool axis at a certain angle, each peeling tooth engaging with the workpiece moves axially relative to and within the workpiece and carries off a peeled chip. No peeling tooth cuts into the material in the area where, according to the invention, one or more cutting teeth on the peeling wheel are missing. During this machining phase, the associated spacewidth of the workpiece is not increased. The number of cutting teeth assigned to a periodically recurring interval is selected so that this number is not a divisor of the number of teeth of the set to be fabricated. The spacewidth not machined before will therefore be extended during one of the following revolutions of the workpiece.

Leaving some of the positions of the regular tooth pitch vacant is not the only way in which the inventive teaching that the distance between at least some identically designed teeth of the peeling wheel is equal to a multiple of the regular tooth pitch can be realized. It is also provided that teeth of a different design can be arranged between the separated, identically designed teeth. Here, too, it is provided that the cutting teeth are arranged in periodically recurring intervals around the rotational axis of the peeling wheel. In cases where teeth of different designs are used, one set can be roughing teeth, while the other set can be finishing teeth. It is also possible in the case of differently designed teeth for one set to perform a precutting function and the other set a main cutting function. To this end, the edges of the teeth which are shaped differently from each other can also be a certain distance apart in the axial direction of the peeling wheel. By means of the inventive method and the inventive device, teeth can also be fabricated with projections at their base. There will then be a projecting tooth between each main cutting tooth. The projecting tooth is longer than the main tooth, but narrower.

An exemplary embodiment of the invention is explained below on the basis of the attached drawings:

DETAILED DESCRIPTION OF THE INVENTION

Figure 1:
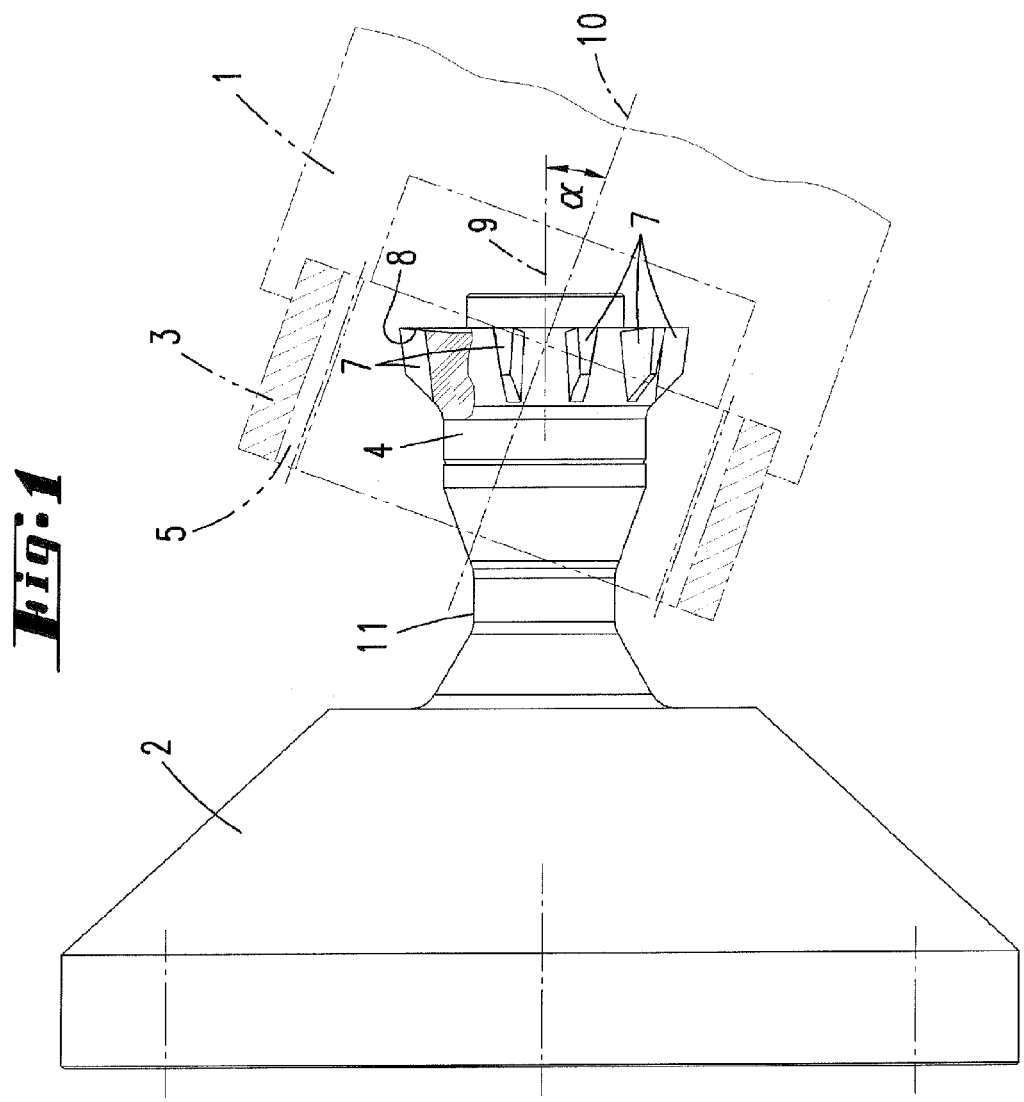
FIG. 1 shows a longitudinal cross section of a peeling wheel 4, which is mounted on a tool spindle 2 and which produces the internal gear teeth 5 of a workpiece wheel 3 mounted on a workpiece spindle 1.

In FIG. 1, the teeth 7 of the peeling wheel 4 are positioned in engagement with the set of teeth 5 of the workpiece wheel 3. The peeling wheel 4 is engaged here at its maximum axial depth. To avoid a collision with the edge of the workpiece 3, the tool spindle 2 needs to be reduced slightly in the neck area 11.

Figure 2:
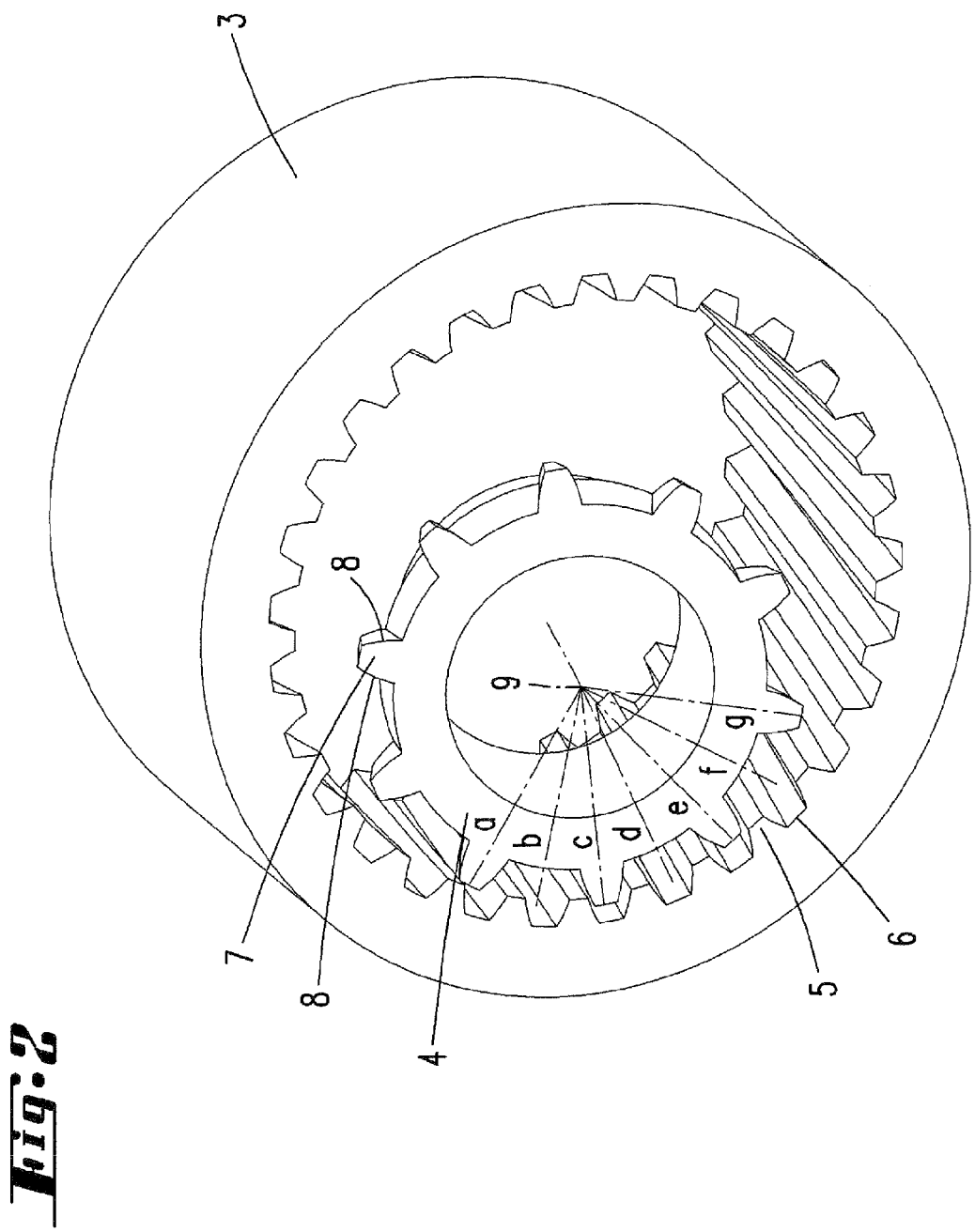
FIG. 2 shows a perspective end view of a workpiece wheel 3, with which a peeling wheel is in engagement.
Figure 3:
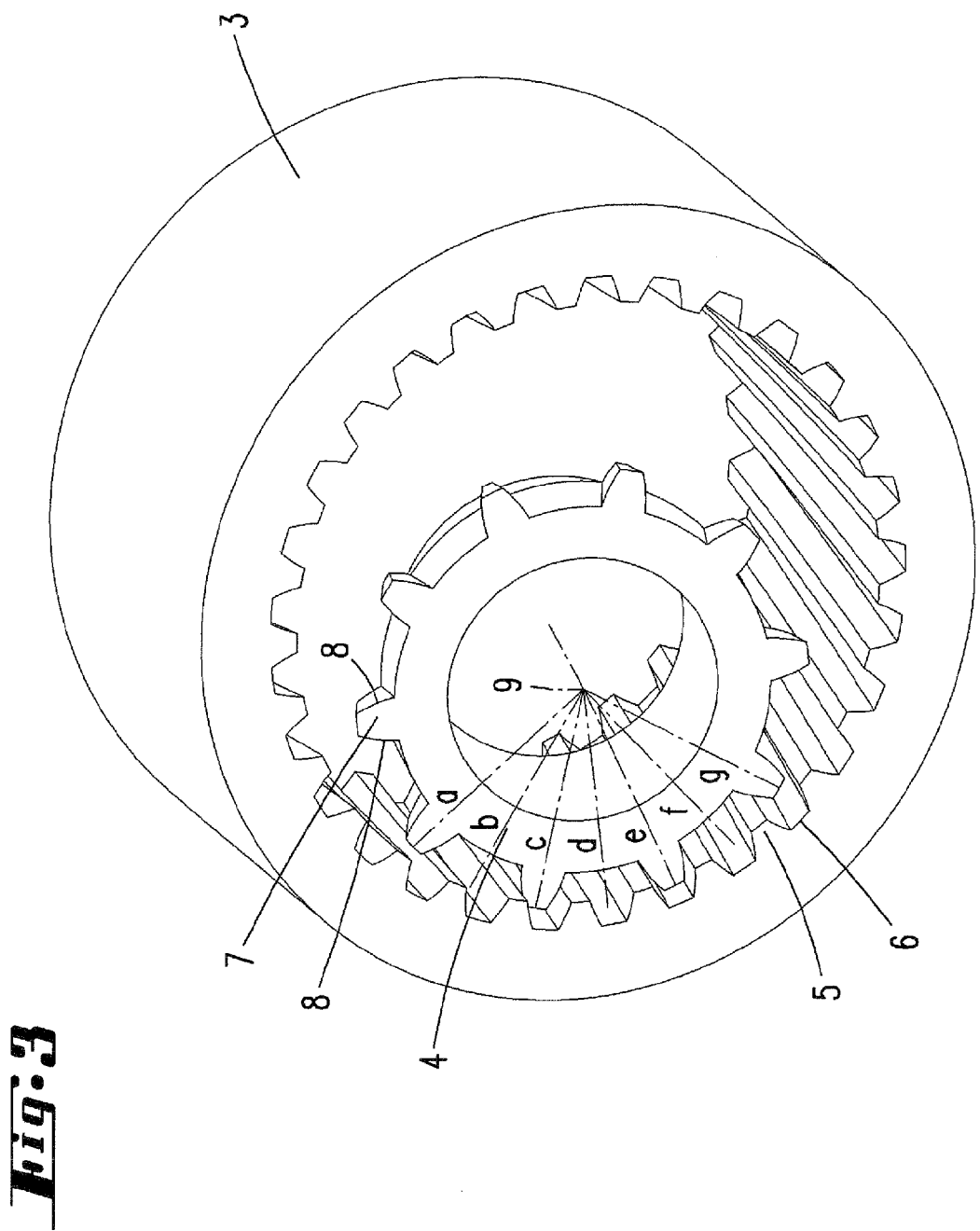
FIG. 3 shows a diagram similar to FIG. 2, wherein the peeling wheel and the workpiece wheel have rotated slightly.

It can be seen from FIGS. 2 and 3 that there is always a peeling tooth 7 of the peeling wheel 4 engaged in a spacewidth 6 between two teeth 5 of the workpiece wheel 3. In the position shown in FIG. 2, the teeth 7 of the peeling wheel 4 located in positions c and e are in the engaged position. In FIG. 3, the peeling tooth 7 in position e is in the position of maximum engagement in the spacewidth 6 of the workpiece wheel 3. The number of teeth 7, 5 engaged simultaneously is smaller than the number according to the prior art.

Although each spacewidth 6 is machined only during every second revolution of the workpiece wheel 3, the dimensional accuracy obtained is very high.

A workpiece spindle 1, which is rotated by an electric motor and can be shifted in its axial direction to produce the feed movement, carries a workpiece wheel 3, which has a tubular, i.e., hollow, shape, and which is to be provided with a set of internal gear teeth.

A workpiece spindle 2, also driven by an electric motor, carries the peeling wheel 4. The peeling wheel 4 has the form of a gear wheel with radially outward-projecting peeling teeth 7, which comprise cutting edges 8.

By means of an electronic control unit (not shown), the workpiece spindle 1 and the tool spindle 2 are driven synchronously. During the peeling movement, the peeling teeth 7 of the peeling wheel 4 plunge into the inside wall of the tubular workpiece wheel 3 to peel out the internal toothing. The distance between the spacewidths 6 to be produced, i.e., the distance between the teeth 5 which remain behind on the workpiece wheel 3, corresponds essentially to the tooth pitch of the peeling wheel 4, which is shown by the lines a, b, c, d, e, f, g proceeding from the center 9 of the wheel.

To produce the peeling movement directed in the axial direction, the axis 10 of the workpiece spindle 1 and the axis 9 of the tool spindle 2 are at a fixed axis-crossing angle to each other. By means of the axial displacement of the workpiece wheel 3 in the direction of its axis 10, a feed movement is produced.

In the exemplary embodiment, only every second tooth position a, c, e, g of the peeling wheel 4 is occupied by a peeling tooth 7 with its two cutting edges 8. Two adjacent peeling teeth 7 therefore are separated from each other by a distance equal to twice the tooth pitch, i.e., to twice the tooth spacing of the set of teeth of the workpiece wheel 3.

During the hob peeling process, because there are no teeth in positions b, d, and f, a cutting tooth 7 is therefore present only in every second spacewidth 6 to be produced. Because the workpiece wheel has an odd number of teeth, any given spacewidth 6 is machined only during every second revolution.

Other tooth combinations are possible in other exemplary embodiments, which are not shown. If the workpiece wheel 3 has, for example, an even number of teeth, the peeling wheel 4 will have an odd number of teeth, such as a number divisible by three. Thus every third tooth can be omitted. It is also provided, however, that in each case two successive tooth positions can be left vacant, which means that two teeth directly adjacent to each other in the circumferential direction will be separated from each other by twice the spacewidth.

Figure 4:
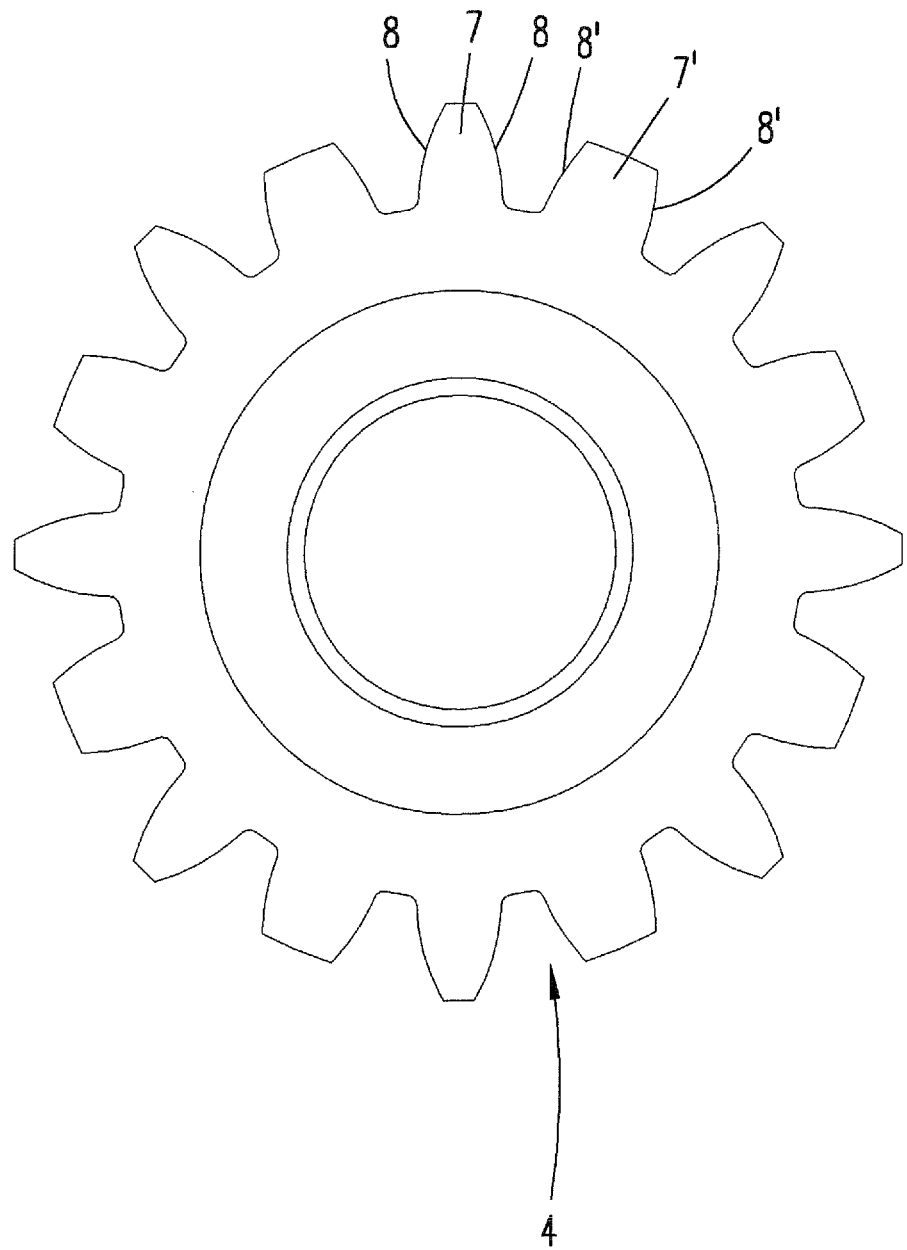
FIG. 4 shows another exemplary embodiment of a peeling wheel 4.

The peeling wheel shown in FIG. 4 has cutting teeth 7, 7' in every tooth pitch position. Peeling teeth 7, 7' with the same shape, i.e., with the same outline contour of their cutting edges 8, 8', however, are separated from each other by a distance equal to twice the regular tooth pitch [i.e., a tooth 7 is separated from the next tooth 7 (of the same shape) by twice the pitch, and a tooth 7' is also separated from the next tooth 7' (of the same shape) by twice the pitch.—JPD]. The peeling tooth 7 forms a "projecting" tooth. The cutting tooth 7' forms a main cutting tooth. The length of the projecting tooth 7 measured in the radial direction relative to the peeling wheel 4 is greater than the length of the main cutting tooth 7'. The distance measured in the circumferential direction between the two cutting edges 8 of the projecting tooth 7, however, is smaller than the distance, measured in the circumferential direction, between the cutting edges 8', 8' of the main cutting tooth 7'.

The use of the peeling wheel 4 shown in FIG. 4 on an inventive device or in an invention method leads to the fabrication of a set of gear teeth, especially a set of internal gear teeth, which includes projecting teeth.

Here, too, when the tool is being designed, the number of teeth, that is, the regular tooth pitch, should be selected so that the largest common divisor of the number of teeth of the workpiece to be fabricated and the number of teeth of the peeling wheel is one.

All of the disclosed features are (in themselves) essential to the invention. The entire content of the disclosure content of the associated/attached priority documents (copy of the prior application) are therefore incorporated into the disclosure of the present application for the purpose, among others, of incorporating features of these documents into the claims of the present application. The subclaims in their facultatively subordinate version characterize independent inventive elaborations of the prior art, in particular so that partial applications can be filed on the basis of these claims.

The invention claimed is:

1. A method for cutting teeth into a workpiece wheel by hob peeling, comprising the steps of:
    rotating a workpiece spindle that holds the workpiece wheel into which the teeth are to be cut, wherein along the root circle of the workpiece wheel, a spacewidth extends between each tooth to be cut,
    rotating a tool spindle that carries a peeling wheel in a fixed speed ratio to the workpiece spindle;
    crossing an axis of rotation of the workpiece wheel at an angle to an axis of rotation of the tool spindle; and
    advancing the peeling wheel, which comprises cutting teeth with a regular tooth pitch by which tooth spacing of the teeth of the workpiece wheel is determined, in a direction of the axis of rotation of the workpiece wheel by relative movement between the tool spindle and the workpiece spindle, wherein each cutting tooth of the peeling wheel is separated from an adjacent cutting tooth of the peeling wheel by a distance equal to at least twice the tooth spacing of the teeth of the workpiece wheel, the cutting teeth having cutting edges that extend along a contour line of the cutting teeth in a plane of a broad side of the teeth,
    wherein the spacewidths of the workpiece wheel include plural groups of plural adjacent spacewidths, a cutting tooth being present only in one spacewidth out of each group of plural adjacent spacewidths during a full given revolution of the peeling wheel.

2. The method according to claim 1, wherein the peeling wheel has no tooth in some positions.

3. The method according to claim 1, including arranging the cutting teeth in periodically recurring intervals around a rotational axis of the peeling wheel.

4. The method according to claim 1, wherein each cutting tooth is separated from a neighboring cutting tooth by a distance equal to a multiple of tooth spacing of the cutting teeth.

5. The method according to claim 4, wherein each cutting tooth is separated from a neighboring cutting tooth by a distance equal to twice the tooth spacing of the cutting teeth.

6. The method according to claim 1, wherein a greatest common divisor of the number of the cutting teeth of the peeling wheel and the number of teeth of the workpiece wheel to be produced is one.

7. The method according to claim 1, wherein the cutting teeth are arranged around a rotational axis in positions determined by the tooth pitch, each of the cutting teeth having cutting edges.

* * * * *